US010346533B2

(12) United States Patent
Link et al.

(10) Patent No.: US 10,346,533 B2
(45) Date of Patent: *Jul. 9, 2019

(54) MANAGEMENT OF CONTENT TAILORING BY SERVICES

(71) Applicant: International Business Machines Corporation, Armonk, NY (US)

(72) Inventors: Claudius Link, Kassel (DE); Matthias Seul, Kassel (DE)

(73) Assignee: International Business Machines Corporation, Armonk, NY (US)

( * ) Notice: Subject to any disclaimer, the term of this patent is extended or adjusted under 35 U.S.C. 154(b) by 526 days.

This patent is subject to a terminal disclaimer.

(21) Appl. No.: 14/726,893

(22) Filed: Jun. 1, 2015

(65) Prior Publication Data
US 2016/0063111 A1    Mar. 3, 2016

Related U.S. Application Data

(63) Continuation of application No. 14/475,805, filed on Sep. 3, 2014, now Pat. No. 9,916,298.

(51) Int. Cl.
| G06F 17/30 | (2006.01) |
| G06F 17/27 | (2006.01) |
| H04L 29/08 | (2006.01) |
| G06F 16/951 | (2019.01) |

(52) U.S. Cl.
CPC ........ *G06F 17/2705* (2013.01); *G06F 16/951* (2019.01); *G06F 17/274* (2013.01); *H04L 67/02* (2013.01)

(58) Field of Classification Search
CPC .............. G06F 17/2705; G06F 17/274; G06F 17/30864; G06F 16/951; H04L 67/02
See application file for complete search history.

(56) References Cited

U.S. PATENT DOCUMENTS

| 7,761,464 B2 | 7/2010 | Radlinski et al. |
| 8,001,064 B1 | 8/2011 | Rennison |
| 8,086,621 B2 | 12/2011 | Gerber |
| 8,086,631 B2 | 12/2011 | Gollapudi |
| 8,112,407 B2 | 2/2012 | Jung et al. |
| 8,180,776 B2 | 5/2012 | Haveliwala et al. |
| 8,239,380 B2 | 8/2012 | Brill |
| 8,244,721 B2 | 8/2012 | Morris et al. |

(Continued)

OTHER PUBLICATIONS

IBM Appendix P, list of IBM patents or patent applications treated as related, pp. 1-2, dated Jun. 1, 2015.
De Gemmis, et al., "A Retrieval Model for Personalized Searching Relying on Content-based User Profiles", Copyright © 2008, Association for the Advancement of Artificial Intelligence, pp. 1-9, <http://www.aaai.org/Papers/Workshops/2008/WS-08-06/WS08-06-001.pdf>.

(Continued)

*Primary Examiner* — Huawen A Peng
(74) *Attorney, Agent, or Firm* — Robert D. Bean

(57) ABSTRACT

Embodiments of the present invention provide systems, methods, and computer program products for processing responses from services (e.g., content providers) and managing content tailoring by services and/or recommender systems used by those services. Embodiments of the present invention can afford users with the ability to control the diversity of content in responses provided by services based one or more detected themes of the responses. Furthermore, embodiments of the present invention may be used to provide users with enriched responses from services, without needing cooperation of those services.

8 Claims, 10 Drawing Sheets

(56) References Cited

U.S. PATENT DOCUMENTS

| | | |
|---|---|---|
| 8,352,465 B1 | 1/2013 | Jing et al. |
| 8,631,001 B2 | 1/2014 | Lawrence et al. |
| 8,631,030 B1 | 1/2014 | Bhattaharjee et al. |
| 9,298,813 B1 | 3/2016 | Kraley |
| 9,576,574 B2 | 2/2017 | van Os |
| 2007/0294225 A1 | 12/2007 | Radlinski et al. |
| 2009/0327270 A1 | 12/2009 | Teevan et al. |
| 2010/0131563 A1 | 5/2010 | Yin |
| 2011/0295678 A1* | 12/2011 | Seldin .................... G06Q 30/02 705/14.42 |
| 2012/0005183 A1 | 1/2012 | Monteverde et al. |
| 2013/0103672 A1 | 4/2013 | Parikh et al. |
| 2014/0379708 A1 | 12/2014 | Fox |
| 2015/0161124 A1 | 6/2015 | Keshava |
| 2015/0161176 A1 | 6/2015 | Majkowska et al. |
| 2017/0017694 A1 | 1/2017 | Roytman et al. |

OTHER PUBLICATIONS

Serdyukov, Paul, "Dealing with heterogeneity in profiles for Personalized Information Retrieval—Extended abstract", Jul. 2006, pp. 1-3, <http://citeseerx.ist.psu.edu/viewdoc/download?doi=10.1.1.95.7063&rep=rep1&type=pdf>.

Vallet, et al., "Personalized Diversification of Search Results", SIGIR '12, Aug. 12-16, 2012, Portland, Oregon, USA, Copyright 2012 ACM, pp. 1-10, <http://ir.ii.uam.es/predict/pubs/sigir12-vallet.pdf>.

"Enhancing a search engine with anomalous search results", An IP.com Prior Art Database Technical Disclosure, Authors et. al.: Disclosed Anonymously, IP.com No. IPCOM000224777D, IP.com Electronic Publication: Jan. 3, 2013, pp. 1-3, <http://ip.com/IPCOM/000224777>.

"Management of Content Tailoring by Services", U.S. Appl. No. 14/475,805, filed Sep. 3, 2014, pp. 1-52.

* cited by examiner

MANAGEMENT OF CONTENT TAILORING BY SERVICES

FIELD OF THE INVENTION

The present invention relates generally to the field of web based content providers, and more particularly to managing content tailoring services and enriching responses from services.

BACKGROUND OF THE INVENTION

Web services that serve as content providers, such as search engines, social networks, and media outlets, often utilize recommender systems that tailor content for a user. For example, a recommender system may tailor content for a user by providing advertisements, search results, articles, and/or other content that pertains to a user's interests, demographic, or other preferences.

While tailoring content can be useful to filter large amounts of general information, recommender systems can also create a "content bubble", where a user's requests for information are consistently fulfilled with non-diverse, personalized responses. Content bubbles may, therefore, limit a user's exposure to diverse content, such as content that pertains to alternative viewpoints and topics, even when such diverse content may be of interest to the user.

SUMMARY

Embodiments of the present invention provide systems, methods, and program products for processing a response from a service. In one embodiment, a method is provided, the method comprising: receiving, by one or more computer processors, a first response from a service, wherein the first response is generated as a response to a query sent to the service from a computer system; extracting, by one or more computer processors, text content from the first response; determining, by one or more computer processors, whether the extracted text content from the first response is diverse in accordance with a user specification; and responsive to determining that the extracted text content from the first response is not diverse in accordance with the user specification, modifying, by one or more computer processors, the first response to create a second response that is diverse in accordance with the user specification.

DETAILED DESCRIPTION

Embodiments of the present invention provide systems, methods, and computer program products for managing content tailoring by services and/or recommender systems used by those services. Embodiments of the present invention can help prevent content bubbles and can afford users with the ability to control the diversity of content in responses provided by services. Furthermore, embodiments of the present invention may be used to provide users with enriched responses from services without needing the cooperation of those services.

Figure 1:
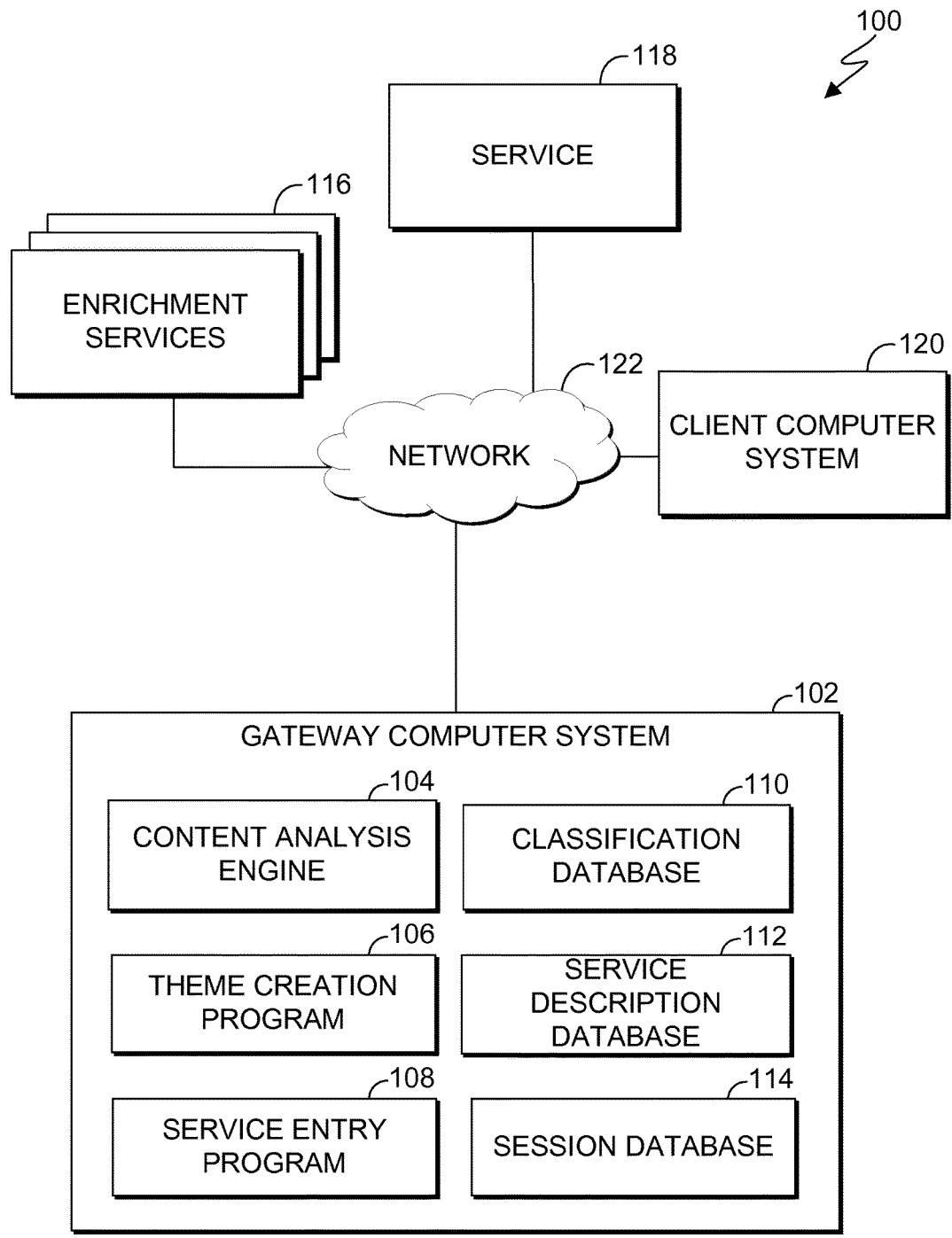
FIG. 1 is a block diagram of a computing environment, in accordance with an embodiment of the present invention.

FIG. 1 is a functional block diagram of computing environment 100, in accordance with an embodiment of the present invention. Computing environment 100 includes gateway computer system 102, enrichment services 116, service 118, and client computer system 120, all interconnected by network 122. Gateway computer system 102 and client computer system 120 can be desktop computers, laptop computers, specialized computer servers, or any other computer systems known in the art. In certain embodiments, gateway computer system 102 and client computer system 120 represent computer systems utilizing clustered computers and components to act as a single pool of seamless resources when accessed through network 122. In certain embodiments, gateway computer system 102 and client computer system 120 represent virtual machines. In general, gateway computer system 102 and client computer system 120 are representative of any electronic device, or combination of electronic devices, capable of executing machine-readable program instructions, as discussed in greater detail with regard to FIG. 9.

Gateway computer system 102 includes content analysis engine 104, theme creation program 106, service entry program 108, classification database 110, service description database 112, and session database 114. Gateway computer system 102 captures requests sent from client computer system 120 to service 118 via network 122, and captures responses sent from service 118 to client computer system 120. In this exemplary embodiment, gateway computer system 102 is configured as an intermediary computer system, such as an HTTP gateway.

Content analysis engine 104 manages requests sent from client computer system 120 to service 118, as well as responses sent from service 118 to client computer system 120. In this embodiment, content analysis engine 104 captures and processes outgoing HTTP requests sent from client computer system 120 to service 118 (i.e., preventing the requests from being sent directly to service 118), as well as responses from service 118 to client computer system 120 (i.e., preventing the responses from being sent directly to client computer system 120). As discussed in greater detail later in this specification, content analysis engine 104 may process responses from service 118 to ensure that the content of such responses is sufficiently diverse. In some instances, content analysis engine 104 may access enrichment services 116 via network 122 to obtain additional content with which to enrich a response from service 118, and then initiate transmission of the enriched response to client computer system 120. In other instances, content analysis engine 104 may determine that content in a response from service 118 is sufficiently diverse, and then initiate transmission of the original response to client computer system 120.

Theme creation program 106 creates themes that are used to classify content of responses received by content analysis engine 104 from service 118 or enrichment services 116. In this exemplary embodiment, an administrative user of gateway computer system 102 can use theme creation program 106 to create themes (e.g., "cars", "computers", or "vacations"), each of which comprises a plurality of text elements that correspond to that theme. Theme creation program 106 may also create refinements of themes, each of which comprises a plurality of text elements that correspond to a subcategory for that theme (e.g., "sports cars").

Service entry program 108 creates service entries for service 118, enrichment services 116, and one or more other services. In this exemplary embodiment, an administrative user of gateway computer system 102 can use service entry program 108 to create service entries and store the service entries in service description database 112, as discussed in greater detail with regard to FIG. 5.

Classification database 110 stores themes and refinements created by theme creation program 106. Content analysis engine 104 can access classification database 110 to obtain stored themes and refinements.

Service description database 112 stores service entries for service 118, enrichment services 116, and one or more other services. In this exemplary embodiment, service entries stored in service description database 112 comprise information pertaining to identification, accessibility, and capabilities of services, along with any instructions for managing schema for services and reducing content tailoring.

Session database 114 stores information pertaining to active or previously established sessions created by content analysis engine 104 for requests received from client computer system 120 and/or responses received from service 118. For example, session information may include a record of a user's query, records of prior queries to service 118 and other services, identification information for a user, and/or tracking information that can be used to associate a request sent to service 118 with a corresponding response received from service 118.

Classification database 110, service description database 112, and session database 114 can be implemented using any database architecture known in the art, such as a relational database, an object-oriented database, and/or one or more tables. Similarly, in other embodiments, classification database 110, service description database 112, and/or session database 114 can be hosted remotely and accessed by gateway computer system 102 via network 122.

Service 118 is a service (e.g., a web service or content provider) accessible by client computer system 120 and gateway computer system 102 via network 122. Service 118 can comprise one or more programs executing on one or more computer systems. Service 118 receives one or more requests for content and, in response, service 118 delivers one or more responses. Service 118 may include one or more recommender systems that tailor content provided in response to received requests based on the particular user of client computer system 120 (i.e., personalized content for that user). Examples of services which may be represented by service 118 include, but are not limited to, search engines, blogging platforms, social media outlets, and news outlets. Examples of recommender systems which may be utilized by service 118 include, but are not limited to, systems that customize search results, articles, news information, messages, alerts, product recommendations, other multimedia content, and combinations thereof.

Enrichment services 116 are one or more services (e.g., a web service or content provider, as previously discussed) accessible by gateway computer system 102 via network 122. In this exemplary embodiment, content analysis engine 104 can query enrichment services 116 to obtain content with which to enrich a response from service 118 (e.g., to increase content diversity), prior to transmitting the response to client computer system 120. In some instances, service 118 may also be used as an enrichment service 116.

Network 122 can be, for example, a local area network (LAN), a wide area network (WAN) such as the Internet, or a combination of the two, and include wired, wireless, or fiber optic connections. In general, network 122 can be any combination of connections and protocols that will support communications between gateway computer system 102, client computer system 120, service 118, and enrichment services 116, in accordance with embodiments of the present invention.

It should be understood that, for illustrative purposes, FIG. 1 does not show other computer systems and elements which may be present when implementing embodiments of the present invention. For example, while FIG. 1 shows a single client computer system 120 and service 118, computing environment 100 can include additional client computer systems 120 that access multiple services 118.

Figure 2:
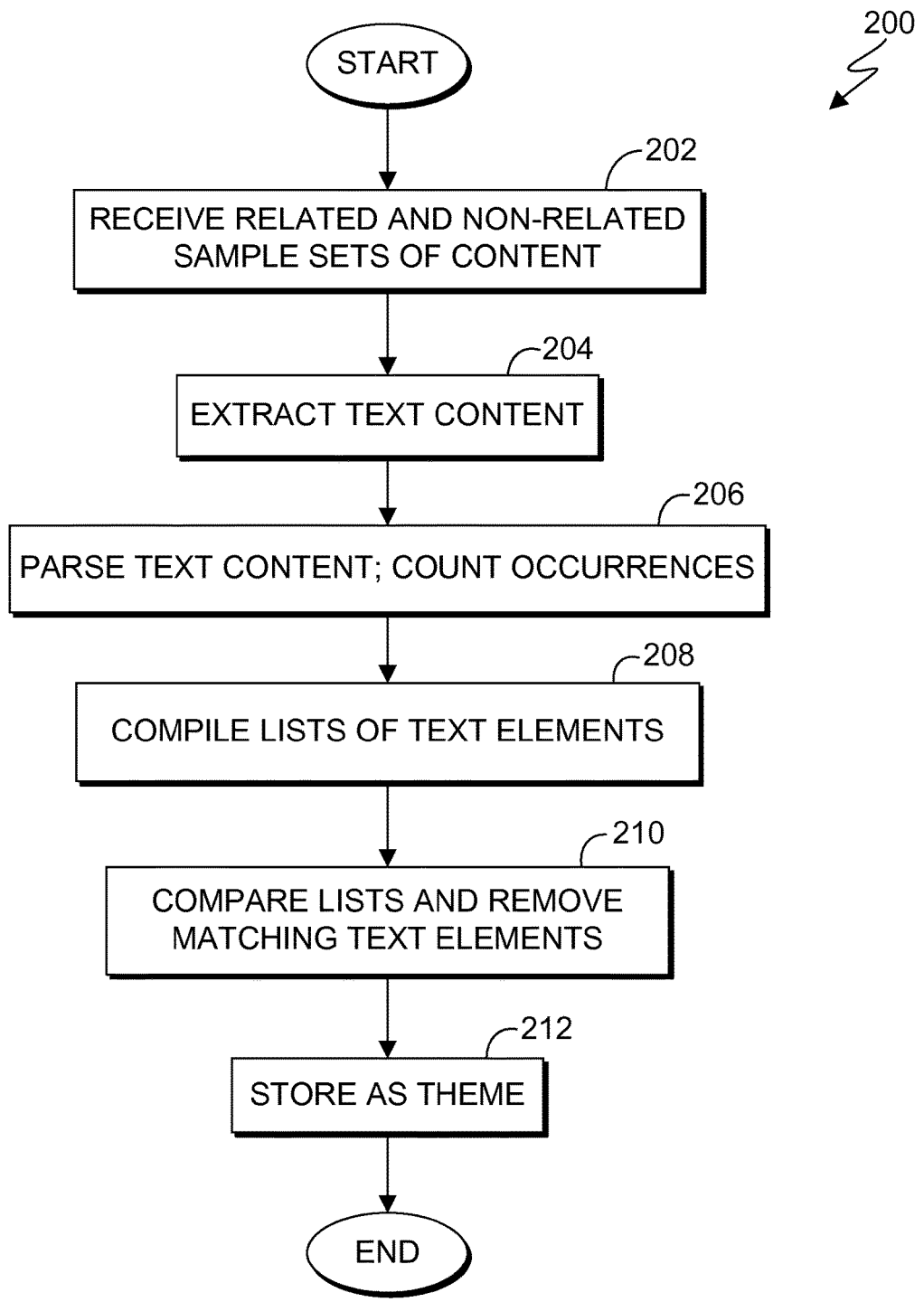
FIG. 2 is a flowchart illustrating operational steps for creating a theme, in accordance with an embodiment of the present invention.

FIG. 2 is a flowchart 200 illustrating operational steps for creating a theme, in accordance with an embodiment of the present invention. The term "theme", as used herein, refers to a list of text elements that relate to, describe, or otherwise pertain to a particular topic of interest. The term "text element", as used herein, is a string of one or more characters that is significant as a group (e.g., a token). A text element may be, for example, a keyword, phrase, numerical value, and/or combinations thereof.

In step 202, theme creation program 106 receives a sample set of content that is related to the theme (i.e., a related sample set), and a sample set of content that is not related to the theme (i.e., a non-related sample set). In this exemplary embodiment, a user selects a related sample set of content comprising content that relates to, describes, or otherwise embodies the topic of the theme. For example, if creating a theme for the topic "car", a related sample set of content may comprise content that depicts or discusses cars or subjects related to cars (e.g., car companies, car components, etc.). The user selects a non-related sample set of content comprising content that does not relate to, or otherwise embody, the topic of the theme. For example, if creating a theme for the topic "car", a non-related sample set of content may comprise content depicting or discussing subjects having no relation to cars.

Content contained in the related and non-related sample sets can be of any suitable type, such as text documents, web articles, or any other web-based content with textual information. The user may compile the sample sets of content manually, in an assisted fashion (e.g., using existing sample sets of content), or using any combination of both techniques. The size of the related and non-related sample sets may also be varied by the user. Typically, as discussed in greater detail below, larger sample sets result in a theme whose text elements are more likely to appear in content pertaining to the topic, while being less likely to appear in content that does not pertain to the topic. In one embodiment, the size of the related sample set is at least 100,000 pieces of sample content, and the size of the non-related sample set is at least 1,500,000 pieces of sample content.

In step 204, theme creation program 106 extracts text content from the content contained in the related and non-related sample sets. Depending on the type of content, the text content may already be in suitable form for subsequent processing (e.g., plain text form) and theme creation program 106 may copy the text content therefrom. Where the content exists in a structured form, such as in XML and HTML documents, theme creation program 106 extracts text content from the documents, in accordance with the appropriate schemas.

In step 206, theme creation program 106 parses the extracted text content of the related and non-related sample sets to obtain one or more text elements. Theme creation program 106 also determines the number of occurrences for each text element in the extracted text content of the related and non-related sample sets (i.e., the total number of times each text element appears in all of the text content extracted from the related sample set, and the total number of times each text element appears in all of the text content extracted from the non-related sample set). In this exemplary embodiment, a user may specify how theme creation program 106 parses the text content, including a limit on the maximum number of keywords allowed for a given text element. For example, if the user specifies a maximum number of two keywords per text element, theme creation program 106 can parse the extracted text content of the related and non-related sample sets to obtain text elements comprising individual keywords and two-keyword combinations.

In step 208, theme creation program 106 compiles lists of text elements and their respective occurrences that were identified in step 206. In this exemplary embodiment, theme creation program 106 compiles a list of text elements identified in the extracted content of the related sample set (excluding duplicate text elements) and a separate list of text elements identified in the extracted content of the non-related sample set (excluding duplicate text elements). Theme creation program 106 may also maintain a text element list for each individual piece of content containing the text elements found in that piece of content. Such individual lists may be used, for example, to facilitate creation of refinements of themes, as discussed in greater detail with regard to FIG. 3.

In step 210, theme creation program 106 compares the compiled list of text elements for the related sample set with the compiled list of text elements for the non-related sample set, and theme creation program 106 removes any matching elements present in both compiled lists from the compiled list of text elements for the related sample set. Stated differently, theme creation program 106 removes from the compiled list of text elements for the related sample set any text elements which are also found in the compiled list for the non-related sample set.

In step 212, theme creation program 106 stores the compiled list of text elements for the related sample set, along with their respective numbers of occurrences, as a theme in classification database 110.

Accordingly, by performing the operational steps of FIG. 2, theme creation program 106 can create a theme comprising a list of text elements which pertain to the topic of the theme and are specific to the topic of the theme, while eliminating text elements that do not pertain to the topic of the theme, or which might pertain to the topic of the theme but also pertain to content that is not related to the topic of the theme. The operational steps of FIG. 2 may be repeated for multiple topics and themes. Similarly, additional related and non-related sample sets of content may be processed to build a more comprehensive list of text elements for a theme, and/or to remove additional text elements that pertain to the topic but also pertain to non-related topics. In other embodiments of the present invention, a theme can be created using an existing list of text elements related to the topic of the theme, such as text elements from an existing commercial classification database or text elements obtained through behavior studies designed to identify words associated with a given topic.

Figure 3:
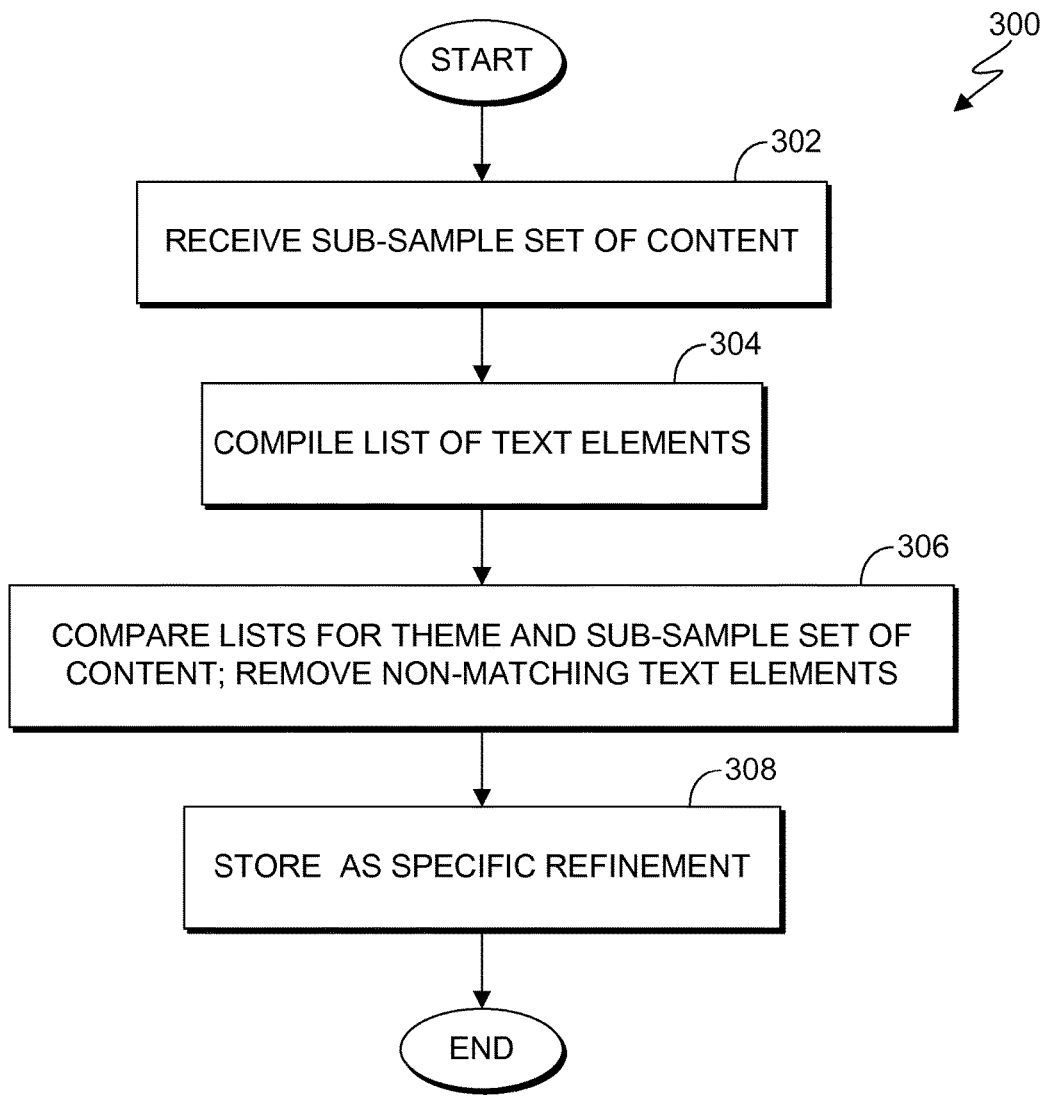
FIG. 3 is a flowchart illustrating operational steps for creating a refinement of a theme, in accordance with an embodiment.

FIG. 3 is a flowchart 300 illustrating the operational steps for creating a specific refinement, in accordance with an embodiment of the present invention. The term "specific refinement", as used herein, refers to a list of text elements that relate to, describe, or otherwise pertain to a particular subcategory of the theme. For example, specific refinements for the theme "car" may include "maker type", "model type", or "body type", each of which comprises a list of text elements that relate to, describe, or otherwise pertain to those respective subcategories.

In step 302, theme creation program 106 receives a sub-sample set of content that is related to the specific refinement (i.e., a related sub-sample set) of a theme. In this exemplary embodiment, the sub-sample set of content is selected from the related sample set of content for the theme (e.g., by a user, or using one or more automation techniques), and the related sub-sample set of content comprises content that relates to, describes, or otherwise embodies the specific refinement. For example, if creating a specific refinement for "model type" of a theme "cars", the related sub-sample set of content may comprise content selected from the related sample set for the theme "cars" that depicts, discusses, or otherwise relates specifically to model types of cars (e.g., reviews or comparisons of different model types of cars).

In step 304, theme creation program 106 compiles a list of text elements for the sub-sample set of content. In this exemplary embodiment, theme creation program 106 compiles the list of text elements by using individual lists of text elements associated with each of the pieces of content in the sub-sample set that were previously created by theme creation program 106 during creation of the theme (e.g., in step 206 of FIG. 2). In other embodiments, theme creation program 106 may compile the list of text elements by again extracting text content from the sub-sample set of content, and then parsing the extracted text content for text elements, as previously discussed with regard to FIG. 2.

In step 306, theme creation program 106 compares the compiled list of text elements for the related sub-sample set with the compiled list of text elements for the theme, and theme creation program 106 removes any non-matching text elements from the compiled list of text elements for the related sub-sample set. Stated differently, theme creation program 106 removes from the compiled list of text elements for the related sub-sample set any text elements which are not found in the list of text elements for the theme.

In step 308, theme creation program 106 stores the compiled list of text elements for the related sub-sample set, along with their respective occurrences, as a specific refinement in classification database 110.

Accordingly, by performing the operational steps of FIG. 3, theme creation program 106 can create a specific refinement comprising a list of text elements which pertain to the subcategory of the theme and are specific to the subcategory of the theme, while eliminating text elements that do not pertain to the subcategory of the theme, or which might pertain to the subcategory of the theme but also pertain to content that is not related to the subcategory of the theme. The operational steps of FIG. 3 may be repeated for multiple refinements of one or more themes. As previously discussed, a specific refinement can also be created using an existing list of text elements related to the topic of the specific refinement, taken from a larger list of text elements related to the theme.

Figure 4:
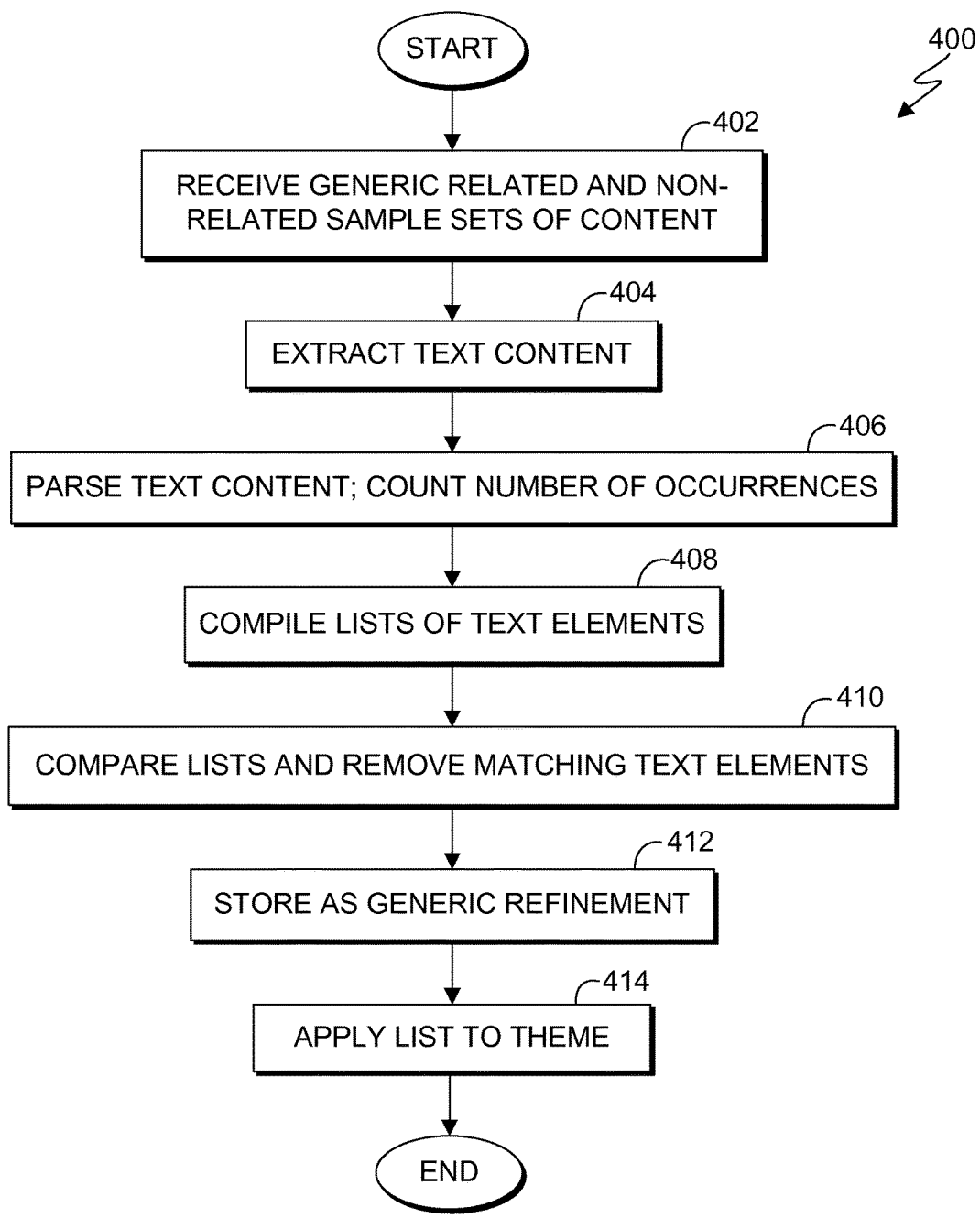
FIG. 4 is a flowchart illustrating operational steps for creating a refinement of a theme, in accordance with another embodiment of the present invention.

FIG. 4 is a flowchart 400 illustrating the operational steps for creating a generic refinement, in accordance with an embodiment of the present invention. The term "generic refinement", as used herein, refers to a compiled list of text elements that relate to, describe, or otherwise pertain to a topic that is applicable to multiple themes. Generic refinements, once created, can be applied to one or more themes to create refinements of those themes. For example, a generic refinement for "red" would be a compiled list of text elements that relate to, describe, or otherwise pertain to the topic "red". The generic refinement for "red" may then be applied, for example, to themes for "cars", "consumer products", "planets", etc. to create refinements of those themes, such as "red cars", "red consumer products", "red planets", etc.

In step 402, theme creation program 106 receives a sample set of content that is related to the topic of the generic refinement (i.e., a generic related sample set), and a sample set of content that is not related to the topic of the generic refinement (i.e., a generic non-related sample set). In this exemplary embodiment, a user selects a generic related sample set of content comprising content that relates to, describes, or otherwise embodies the topic of the generic theme. For example, if creating a generic refinement for the topic "red", a related sample set of content may comprise content that pertains to, or discusses, various things that are red (e.g., animals, objects, names of colors that are shades of red, etc.). The user selects a non-related generic sample set of content comprising content that does not relate to or otherwise embody the topic of the generic refinement. For example, if creating a generic refinement for the topic "red", a non-related sample set of content may comprise content that does not pertain to or discuss any colors, does not pertain to or discuss the color red, or pertains to or discusses colors other than red.

In step 404, theme creation program 106 extracts text content from the content contained in the generic related and generic non-related sample sets. As previously discussed, the content of these sample sets may be of any suitable type and, depending on the type of the content, theme creation program 106 may copy the text content and/or extract text content in accordance with appropriate schemas.

In step 406, theme creation program 106 parses the extracted text content of the generic related and generic non-related sample sets to obtain one or more text elements. Theme creation program 106 also determines the number of occurrences for each text element in the extracted text content of the generic related and generic non-related sample sets, as previously discussed. Again, a user may specify how theme creation program 106 should parse the text content.

In step 408, theme creation program 106 compiles lists of text elements and their respective occurrences that were identified in step 406. In this exemplary embodiment, theme creation program 106 compiles a list of text elements identified in the extracted content of the generic related sample set (excluding duplicate text elements), and a separate list of text elements identified in the extracted content of the generic non-related sample set (excluding duplicate text elements).

In step 410, theme creation program 106 compares the compiled list of text elements for the generic related sample set with the compiled list of text elements for the generic non-related sample set, and theme creation program 106 removes any matching elements present in both compiled lists from the compiled list of text elements for the generic related sample set. Stated differently, theme creation program 106 removes from the compiled list of text elements for the generic related sample set any text elements which are also found in the compiled list for the generic non-related sample set.

In step 412, theme creation program 106 stores the compiled list of text elements for the generic related sample set, along with their respective numbers of occurrences, as a generic refinement in classification database 110.

In step 414, theme creation program 106 applies the generic refinement to a theme. In this exemplary embodiment, theme creation program 106 accesses classification database 110 to obtain the compiled lists of text elements for the generic refinement and the theme to which the generic refinement will be applied. Theme creation program 106 then compares the lists and removes from the compiled list for the theme all text elements that are not present in the compiled list for the generic refinement. Theme creation program 106 then stores the compiled list for the theme in classification database 110 as a refinement of the theme, without overwriting the original theme.

Accordingly, by performing the operational steps of FIG. 4, theme creation program 106 can create a generic refinement comprising a list of text elements which pertain to a topic that is applicable to multiple themes. Once created and stored in classification database 110, the generic refinement can be applied to one or more themes to create refinements of those themes, which can in turn be stored in classification database 110. Using generic refinements can, therefore, be a more efficient way to create refinements for multiple themes.

Figure 5:
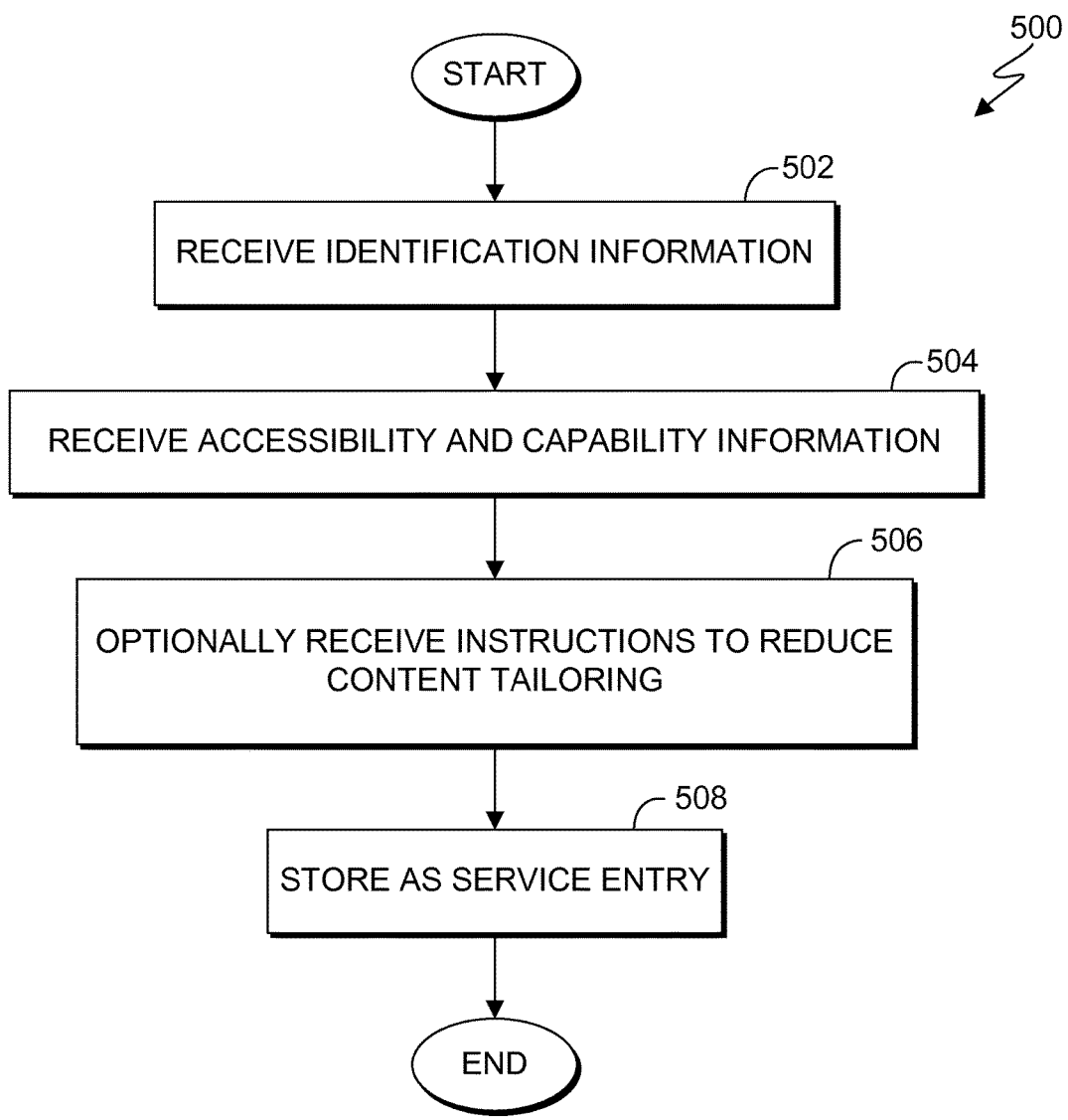
FIG. 5 is a flowchart illustrating operational steps for creating a service entry, in accordance with an embodiment of the present invention.

FIG. 5 is a flowchart 500 illustrating operational steps for creating a service entry for a service, in accordance with an embodiment of the present invention. The term "service entry", as used herein, refers to an entry in service description database 112 comprising information pertaining to identification, accessibility, and capabilities of a service. A service entry is created and stored in service description database 112 for each service used for service 118 and enrichment services 116. Content analysis engine 104 may then access one or more service entries while processing requests and responses to and from service 118 and enrichment services 116, as discussed in greater detail later in this specification. In this exemplary embodiment, service entry program 108 creates and stores a service entry using information provided by an administrative user of gateway computer system 102. For example, the administrative user of gateway computer system 102 may be a vendor deploying an embodiment of the present invention, or a system administrator configuring gateway computer system 102.

In step 502, service entry program 108 receives identification information for the service. In this exemplary embodiment, the administrative user provides information comprising a name and description of the service.

In step 504, service entry program 108 receives information pertaining to accessibility and capabilities of the service. In this exemplary embodiment, the administrative user provides accessibility information comprising any uniform resource locators (URLs), Internet Protocol (IP) addresses, port numbers, or other information needed for content analysis engine 104 to connect to the service via network 122. Regarding capabilities of the service, in this exemplary embodiment, the service is either retrieve capable, enrich capable, or both. The term "retrieve capable", as used herein, refers to a service (e.g., service 118) whose requests and/or responses can be processed and potentially modified by content analysis engine 104, in accordance with embodiments of the present invention. The term "enrich capable", as used herein, refers to services (e.g., enrichment services 116) whose requests and responses can be processed by content analysis engine 104, and which can be queried by content analysis engine 104 to obtain content with which to enrich a response from a retrieve capable service. As discussed, service 118 and enrichment services 116 may be implemented with one or more of the same services. For example, content analysis engine 104 may process requests sent to, and responses received from, a search engine service. At another time, content analysis engine 104 may query the same search engine service to obtain content with which to enrich a response from a service.

If the service is retrieve capable, the administrative user provides information needed for content analysis engine 104 to process requests sent to the service from client computer system 120, as well as information needed for content analysis engine 104 to processes responses received from the service. In this exemplary embodiment, the administrative user provides query schemas used when making requests to the service, such that content analysis engine 104 may properly parse requests made to the service. The administrative user also provides response schemas used for responses from the service, such that content analysis engine 104 may properly parse responses from the service. The administrative user also provides response injection schema and one or more templates that content analysis engine 104 may use to inject additional content into the response from the service, and to ensure that such additional content conforms to the format of the response.

If the service is enrich capable, the administrative user provides information needed for content analysis engine 104 to query the service and process responses from the service. In addition to the identification and accessibility information discussed above, the administrative user provides query schemas used when making requests to the service such that content analysis engine 104 may properly generate a request. The administrative user also provides response schemas used for responses from the service, such that content analysis engine 104 may properly parse responses from the service.

In step 506, service entry program 108 optionally receives instructions for modifying requests sent to the service in order to reduce content tailoring in responses from the service. In this exemplary embodiment, the administrative user optionally provides the instructions to service entry program 108. For example, if the service historically tailors content for users using identification information (e.g., cookies, referrers, identifiers in URLs, etc.), then the administrative user may provide instructions to service entry program 108 to strip such identifying information from requests made to the service in order to reduce content tailoring in responses from the service.

In step 508, service entry program 108 stores the service entry in service description database 112. In this exemplary embodiment, the operational steps of FIG. 5 are repeated to create and store a service entry for each service used for service 118 and enrichment services 116. A vendor, system administrator, or other party deploying an embodiment of the present invention may create and compile a number of service entries and provide them pre-configured with service description database 112. Content analysis engine 104 may then access the service entries while processing requests and responses to and from service 118 and enrichment services 116, to ensure that content in responses from service 118 is sufficiently diverse, as discussed in greater detail later in this specification.

Figure 6:
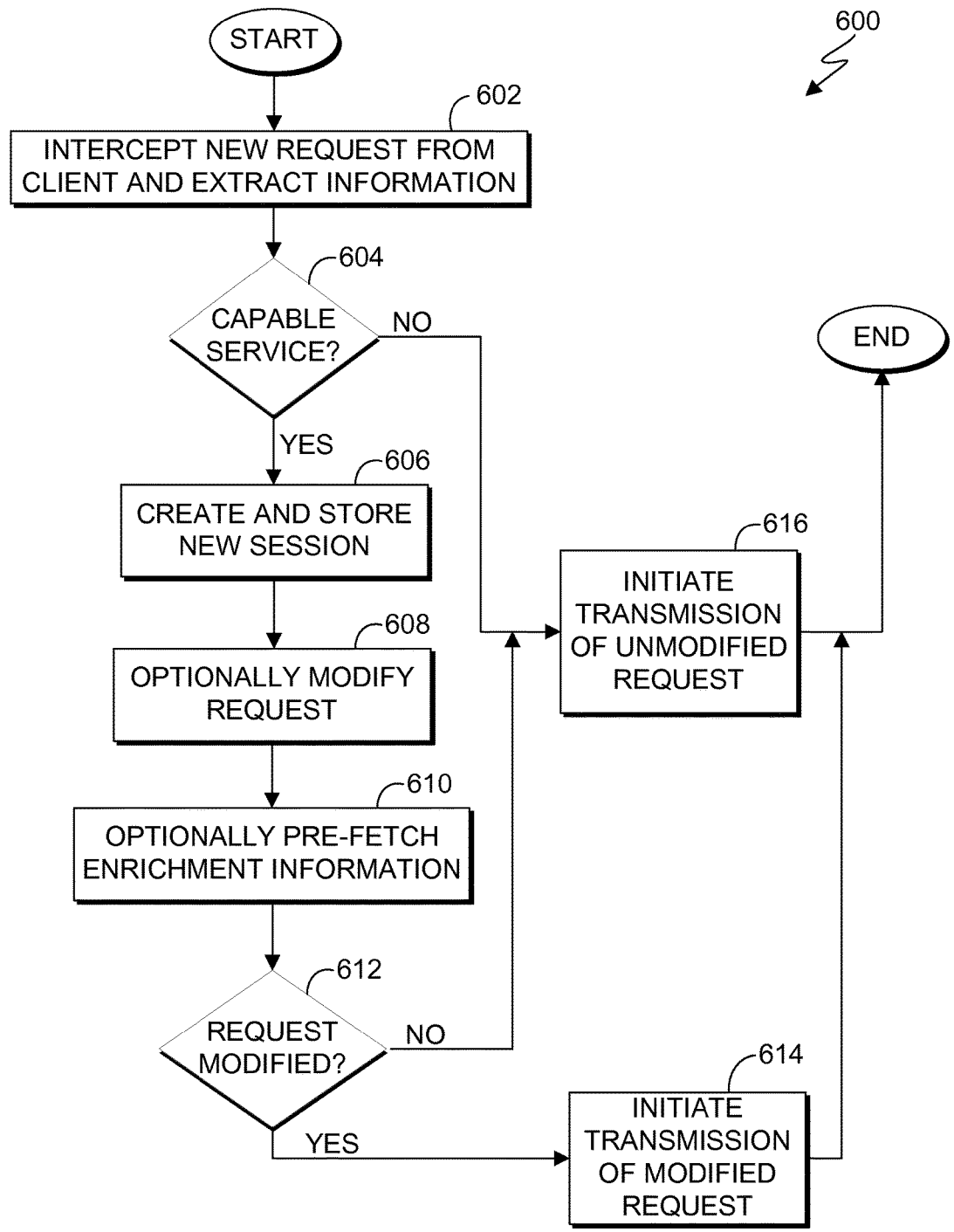
FIG. 6 is a flowchart illustrating operational steps for processing a client request, in accordance with an embodiment of the present invention.

FIG. 6 is a flowchart 600 illustrating operational steps for processing a new request, in accordance with an embodiment of the present invention. In this exemplary embodiment, content analysis engine 104 on gateway computer system 102 captures the new request being sent from client computer system 120, to service 118, through network 122.

In step 602, content analysis engine 104 intercepts a new request from client computer system 120 and extracts information from the request. Depending on the service type of service 118, a new request to service 118 may be, for example, a search query, a request for social media or news content, a request to another internet application, and/or combinations thereof. In this exemplary embodiment, content analysis engine 104 extracts information from the new request that enables content analysis engine 104 to identify service 118, along with query terms. For example, content analysis engine 104 may extract one or more of targeted host information, URLs, parameters, POST content, cookies and other meta information, along with terms of a search query.

In step 604, content analysis engine 104 determines whether service 118 is a retrieve capable service. In this exemplary embodiment, content analysis engine 104 searches service description database 112 to determine whether there exists a service entry for service 118, using the extracted information from step 602.

If, in step 604, content analysis engine 104 determines that service 118 is not a retrieve capable service (i.e., there is no service entry in service description database 112, or the service entry indicates that service 118 is only enrich capable), then, in step 616, content analysis engine 104 initiates transmission of the request (unmodified) to service 118.

If, in step 604, content analysis engine 104 determines that service 118 is a retrieve capable service (i.e., there is a service entry in service description database 112 and it indicates that service 118 is retrieve capable), then, in step 606, content analysis engine 104 creates and stores a new session in session database 114. In this exemplary embodiment, the session is specific to the particular request from client computer system 120 and includes information pertinent to the request (e.g., a unique identifier, one or more portions of the request, date and location information, etc.). Content analysis engine 104 may access the session when handling a response from service 118, as described later in this specification in FIG. 7 and FIG. 7 (CONT.).

In step 608, content analysis engine 104 optionally modifies the request. In this exemplary embodiment, a user can specify instructions for modifying content in the service entry for service 118. Depending on the service entry and user specification for service 118, the request may already be suitable for subsequent processing (e.g., no instructions to reducing content tailoring). Where the service entry indicates a modification, such as removing information identifying a user (i.e., a user associated with transmitting request) from the request or injecting tracing data into the request, content analysis engine 104 modifies the request in accordance with appropriate service entries and user specifications.

In step 610, content analysis engine 104 optionally prefetches enrichment content. In an exemplary embodiment, this optional process can be performed concurrently with subsequent processing (i.e., a parallel process). Content analysis engine 104 may query enrichment services 116 using terms of the query to obtain content with which to enrich responses, as discussed in greater detail with regard to FIG. 8. Accordingly, content analysis engine 104 may expedite enrichment content retrieval from enrichment services 116.

In step 612, content analysis engine 104 determines whether the request has been modified. If, in step 612, content analysis engine 104 determines that the request has been modified (i.e., in step 608), then, in step 614, content analysis engine 104 initiates transmission of the modified request to service 118.

If, in step 612, content analysis engine 104 determines that the request has not been modified then, in step 616, content analysis engine 104 initiates transmission of the original, unmodified request to service 118.

Figure 7:
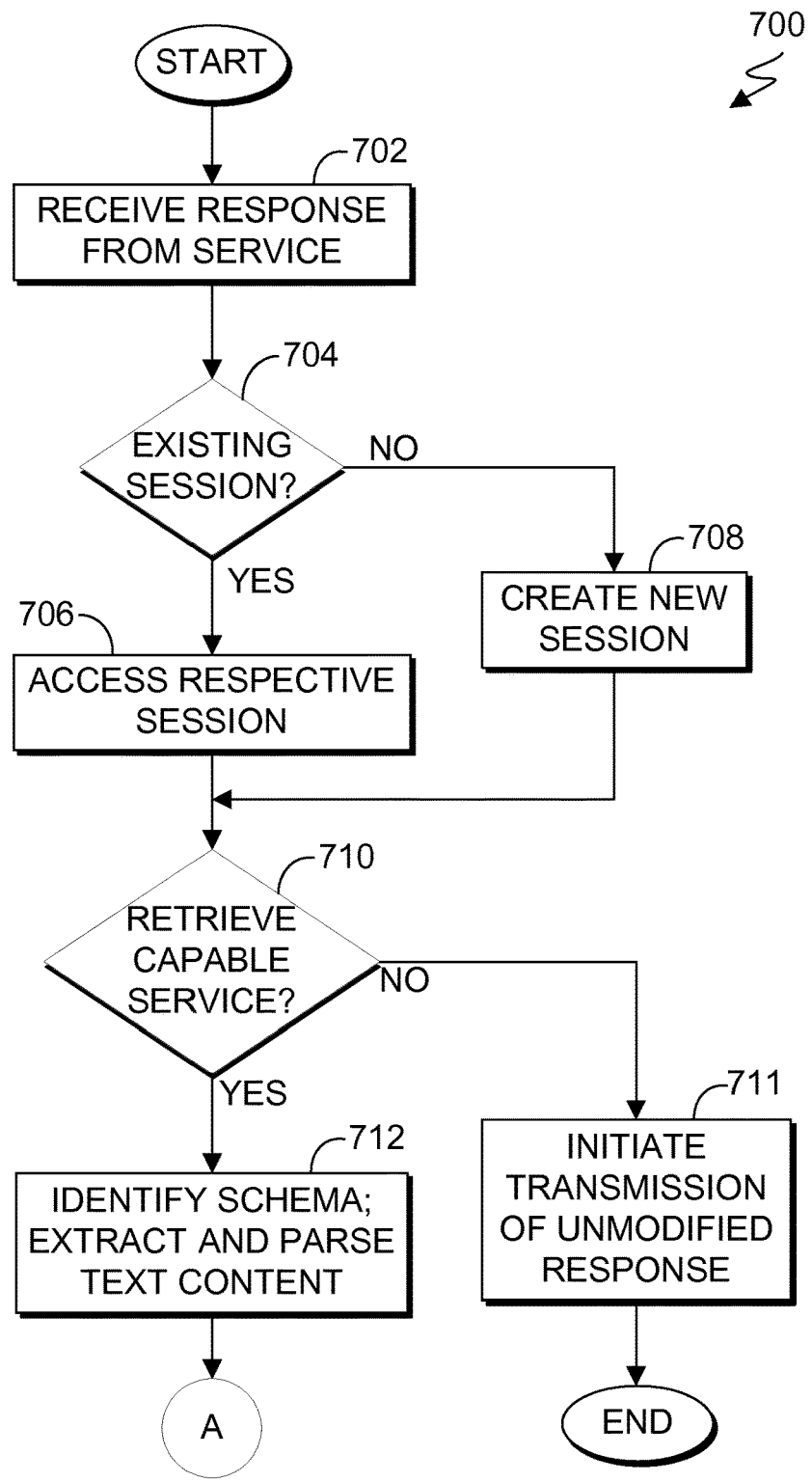
FIG. 7 and FIG. 7 (CONT.) are a flowchart illustrating operational steps for processing a service response, in accordance with an embodiment of the present invention.
Figure 7:
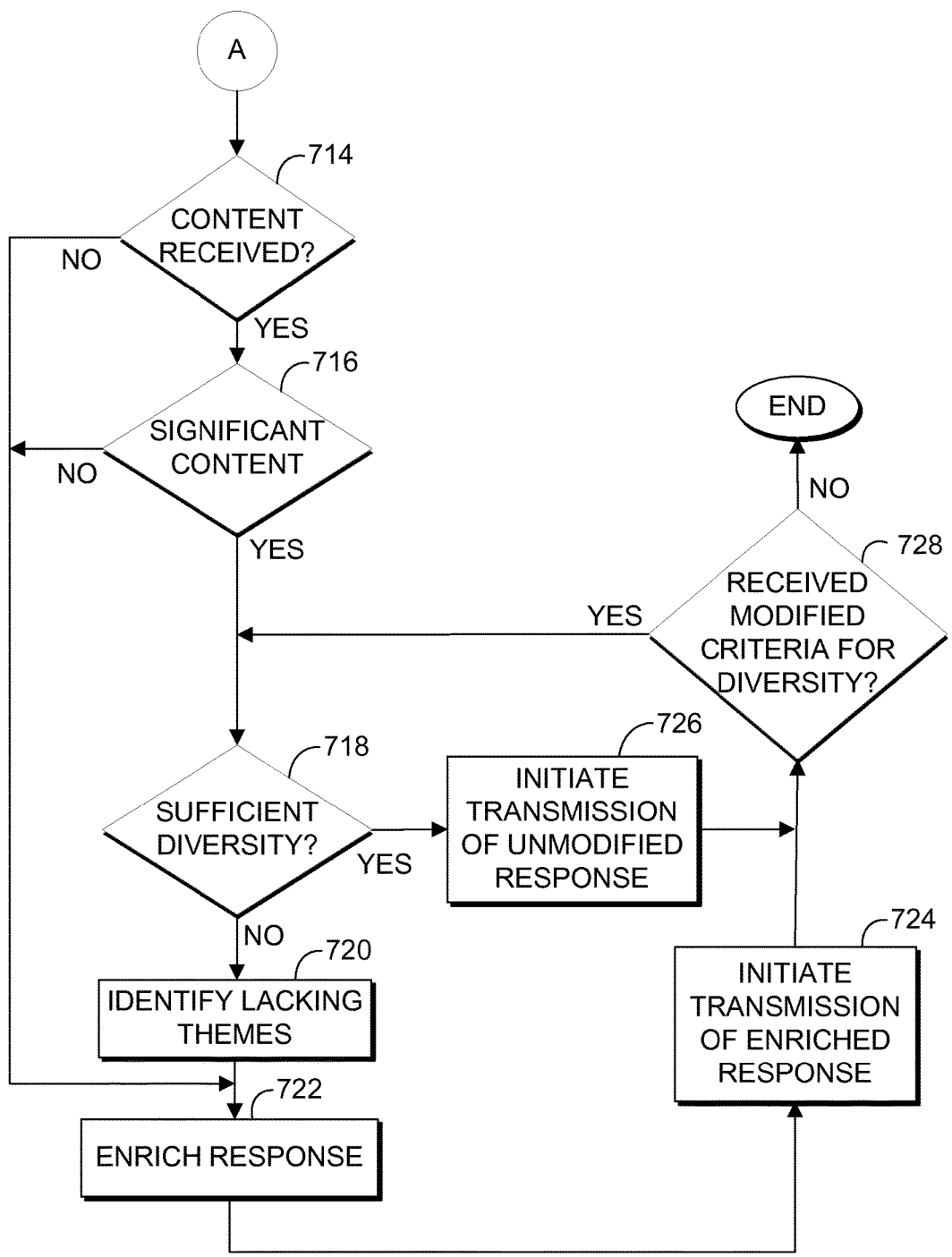

FIG. 7 and FIG. 7 (CONT.) are a flowchart 700 illustrating operational steps for processing a response from service 118, in accordance with an embodiment of the present invention. In this exemplary embodiment, content analysis engine 104 on gateway computer system 102 captures the response being sent from service 118 to client computer system 120 through network 122.

In step 702, content analysis engine 104 receives a response from service 118 and extracts information that identifies service 118. In this exemplary embodiment, the user specifies the information content analysis engine 104 extracts. For example, content analysis engine 104 may capture response headers and/or response bodies. The extracted information assists content analysis engine 104 in identifying service 118 and determining its capabilities.

In step 704, content analysis engine 104 determines whether there is an existing session for service 118 in session database 114. In this exemplary embodiment, content analysis engine 104 searches session database 114 for sessions that match the extracted information for the response (e.g., information comprising X-headers, cookies, tracing data, and similar information) to retrieve an existing session.

If, in step 704, content analysis engine 104 determines that there is an existing session for service 118 in session database 114, then, in step 706, content analysis engine 104 accesses the session.

If, in step 704, content analysis engine 104 determines that there is not an existing session for service 118 in session database 114, then, in step 708, content analysis engine 104 creates and stores a new session in session database 114, as previously discussed with regard to step 606 of FIG. 6.

In step 710, content analysis engine 104 determines whether service 118 is a retrieve capable service. In this exemplary embodiment, content analysis engine 104 searches service description database 112 to determine whether there exists a service entry for service 118.

If, in step 710, content analysis engine 104 determines that service 118 is not a retrieve capable service, then, in step 711, content analysis engine 104 initiates transmission of the original, unmodified response to client computer system 120, as content analysis engine 104 may not possess the information needed to analyze or later enrich the response.

If, in step 710, content analysis engine 104 determines that service 118 is a retrieve capable service, then, in step 712, content analysis engine 104 identifies schemas for service 118, extracts text content from the response, and parses the text content into text elements. In this exemplary embodiment, content analysis engine 104 identifies the respective schema through the service entry for service 118 stored in service description database 112. As previously discussed with regard to theme creation program 106, a user may specify how content analysis engine 104 parses the text content, including a limit on the maximum number of keywords allowed for a given text element.

In step 714, content analysis engine 104 determines whether the response from service 118 contains requested content. For example, the response from service 118 may contain error messages, or may not otherwise contain content requested by a user (i.e., a "no content" situation). In this exemplary embodiment, content analysis engine 104 detects a "no content" situation by analyzing the HTTP header of the response for specific error codes such as "501", "403" or "404", and by searching the text content for keywords that indicate the response does not include requested content, such as "no results found" or "access denied".

If, in step 714, content analysis engine 104 determines that the response from service 118 does not contain requested content, then, in step 722, content analysis engine 104 enriches the response. In this exemplary embodiment, content analysis engine 104 can obtain additional content from one or more of enrichment services 116 and enrich the response from service 118 by modifying the response to include the additional content, thereby providing the user with content where the user would otherwise receive a response that does not contain the requested content. For example, content analysis engine 104 can query enrichment services 116 using terms of the user's query to obtain the additional content. In such cases, content analysis engine 104 may also include a notice in the enriched response to signal that a large part of the content in the response (or all of the content in the response) was provided by enrichment. Enrichment of responses is discussed in greater detail with regard to FIG. 8. In another embodiment, responsive to content analysis engine 104 determining that the response from service 118 does not contain requested content, processing may instead proceed to step 726, where content analysis engine 104 initiates transmission of the original, unmodified response to the client computer system 120 via network 122.

If, in step 714, content analysis engine 104 determines that the response from service 118 does contain requested content (i.e., no error information was found in the text content or HTTP header of the response), then, in step 716, content analysis engine 104 determines whether the response includes significant content. In this exemplary embodiment, content analysis engine 104 determines whether the response includes significant content based on a comparison of themes that match the content in the response and themes that match the terms of the query in the request to service 118.

To detect themes and refinements in the content of the response, content analysis engine 104 searches themes and refinements (i.e., lists of text elements associated with those themes and refinements) stored in classification database 110 for the text elements parsed from the response in step 712. In this exemplary embodiment, content analysis engine 104 first searches the lists of text elements for the themes. Content analysis engine 104 calculates and records a significance score for each theme, expressed as number of occurrences of matched text elements against the total number of text elements for that specific theme (i.e., the total number of times text elements from the theme are found in the text content against the total number of text elements from the theme). If the significance score for a theme satisfies a user specified threshold (e.g., 10%), content analysis engine 104 will then search the lists of text elements for all refinements of the theme. In other embodiments, different methodologies may be used to determine how themes and refinements are searched.

To detect themes and refinements of the terms of the query in the request to service 118, content analysis engine 104 searches the lists of text elements for the themes and refinements stored in classification database 110 for the terms of the query extracted during processing of the request (e.g., step 602 of FIG. 2). In this exemplary embodiment, the themes and refinements searched are determined using the same user specified methodology discussed above.

Content analysis engine 104 compares the themes and refinements detected in the response with the themes and refinements detected in the terms of the query; if there is no match in these themes and/or refinements, or if themes and/or refinements detected in the response and terms of the query have high significance scores (e.g., greater than 30%) but are in unrelated categories (e.g., "cars" and "planets"), then content analysis engine 104 determines that the response content is not significant, and, in step 722, content analysis engine 104 enriches the response. As previously discussed, content analysis engine 104 can obtain additional content from one or more of enrichment services 116, and enrich the response from service 118 by modifying the response to include the additional content. Here, however, the response from service 118 includes content, but content analysis engine 104 has determined that the content is not significant content (e.g., is unrelated to the terms of the user's query, or is nonsensical). Accordingly, content analysis engine 104 enriches the response by replacing less than all (e.g., less than or equal to 50%) of the original content with the additional content obtained from enrichment services 116. In another embodiment, responsive to content analysis engine 104 determining that the response from service 118 does not contain significant content, processing may instead proceed to step 726, where content analysis engine 104 initiates transmission of the original, unmodified response to the client computer system 120 via network 122.

If, in step 716, content analysis engine 104 determines that there is a match in the themes detected in the response and the terms of the query, or if the themes and/or refinements detected in the response and terms of the query have high significance scores (e.g., greater than 30%) and are in related categories (e.g., "cars" and "trucks"), then content analysis engine 104 determines that the response content is significant, and, in step 718, content analysis engine 104 determines whether the content in the response is sufficiently diverse in accordance with a user specification.

In this exemplary embodiment, diversity of content in a response is based upon the themes and refinements detected in the content of the response. A user can specify what constitutes a "sufficiently diverse" response by specifying a requisite number of themes and/or refinements that must be detected. For example, a user can specify that at least four themes and two refinements must be detected in the content of the response (i.e., text elements from the response must be found in the lists of text elements for at least four themes and two refinements) to constitute a sufficiently diverse response. Furthermore, a user can define what constitutes sufficient diversity based on significance scores or other measures of the extent to which detected themes and refinements are represented in the content. For example, a user may specify that if only two themes are detected, the content may still be regarded as being sufficiently diverse so long as either theme is not considerably over represented (e.g., has a significance score that is greater than 50 points higher).

If, in step 718, content analysis engine 104 determines that the content in the response is sufficiently diverse in accordance with the user specification (i.e., the requisite themes and/or refinements are detected in the content of the response), then, in step 726, content analysis engine 104 initiates transmission of the original, unmodified response to client computer system 120 via network 122.

If, in step 718, content analysis engine 104 determines that the content in the response is not sufficiently diverse in accordance with the user specification (i.e., the requisite themes and/or refinements are not detected in the content of the response), then, in step 720, content analysis engine 104 identifies one or more lacking themes. The term "lacking themes", as used herein, refers to detected themes which possess the least amount of text elements that match the text elements of the response text content.

In step 722, content analysis engine 104 enriches the response. As previously discussed, content analysis engine 104 can obtain additional content from one or more of enrichment services 116 and enrich the response from service 118 by modifying the response to include the additional content. Here, the response from service 118 includes significant content, but content analysis engine 104 has determined that the content is not sufficiently diverse. Accordingly, content analysis engine 104 enriches the response by obtaining additional content pertaining to the identified one or more lacking themes, thereby increasing the diversity of content in the response, as discussed in greater detail with regard to FIG. 8.

Content analysis engine 104 may also enrich the response to include one or more input mechanisms in the enriched response that allow a user to make on-the-fly changes to criteria for diversity or other specified parameters. For example, content analysis engine 104 may insert code into the enriched response that displays a slider bar that enables the user to adjust criteria for diversity by sliding a handle from one side of the slider bar to another, representing a continuum of criteria requiring the least amount of content diversity (e.g., only one theme or refinement must be detected) to criteria requiring the greatest amount of content diversity (e.g., at least five themes or refinements must be detected, with differences in significance scores not to exceed 30 points). In another example, content analysis engine 104 may insert code into the enriched response that displays selectable elements (e.g., radio buttons or checkboxes) that enable the user to include or exclude content pertaining certain themes and refinements.

In step 724, content analysis engine 104 initiates the transmission of the enriched response to client computer system 120 via network 122.

In step 728, content analysis engine 104 determines whether modified criteria for diversity have been received from client computer system 120. In this exemplary embodiment, content analysis engine 104 may receive modified criteria for diversity from client computer system 120 in response to a user using one or more input mechanisms included in the enriched response. For example, after viewing the enriched response displayed by client computer system 120, the user may drag a slider bar included therein to increase or decrease criteria for diversity, causing client computer system 120 to transmit modified criteria for diversity to gateway computer system 102 and content analysis engine 104 via network 122. In other embodiments, a user may use other forms of input.

If, in step 728, content analysis engine 104 determines that modified criteria for diversity have been received, then processing repeats at step 718, as previously discussed, except that content analysis engine 104 applies the modified criteria for the purpose of determining whether the content in the response from service 118 is sufficiently diverse and for subsequent processing. In this embodiment, content analysis engine 104 applies the modified criteria on an ad hoc basis for a respective session and response from service 118 (i.e., modified criteria are only temporary criteria for determining diversity). A user may continue to modify criteria for determining sufficient diversity in this manner, causing updated, enriched responses to be transmitted to the client computer system 120 for display to user (e.g., as a page refresh). If the user creates and transmits a new request to service 118 (e.g., a different query to the same service or a query to a different service), then content analysis engine 104 will apply the original specified criteria when determining whether content is sufficiently diverse.

If, in step 728, content analysis engine 104 determines that modified criteria for diversity have not been received, then the operational steps of FIG. 7 and FIG. 7 (CONT.) end.

Accordingly, by performing the operational steps of FIG. 7 and FIG. 7 (CONT.), a request sent by client computer system 120 to service 118, and a corresponding response sent by service 118 to client computer system 120, may be intercepted by gateway computer system 102. Content analysis engine 104 may determine the diversity of content included in the response and, if needed, enrich the response with additional content. The enriched response may then be transmitted to the client computer system 120 instead of the original response from service 118, where it may be provided to a user of client computer system 120 (e.g., displayed in a web browser). Furthermore, the user may make on-the-fly adjustments to control the diversity of content included in the response. In this manner, embodiments of the present invention provide a non-intrusive, efficient, and customizable way for users to control content tailoring of responses from service 118 and ensure that such content is sufficiently diverse. Furthermore, since enriched responses are delivered to the user at client computer system 120, embodiments of the present invention can help reduce the time, computational resources, and network bandwidth that might otherwise be consumed if the user made repeated queries from client computer system 120 to service 118 to obtain diverse results.

Figure 8:
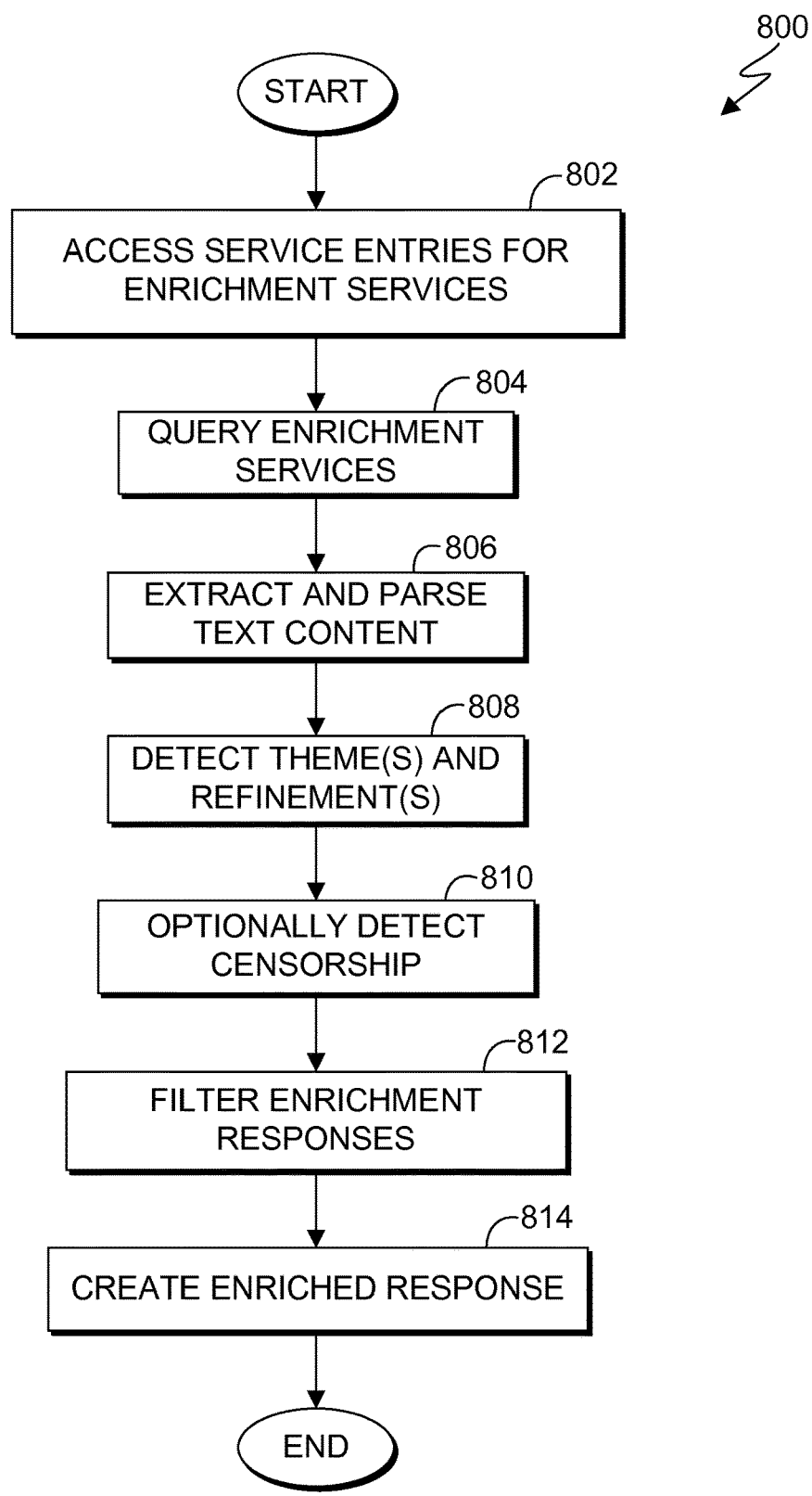
FIG. 8 is a flowchart illustrating operational steps for creating an enriched response, in accordance with an embodiment of the present invention.

FIG. 8 is a flowchart 800 illustrating operational steps for enriching a response from service 118, in accordance with an embodiment of the present invention. For example, the operational steps of flowchart 800 may be performed at step 722 of flowchart 700.

In step 802, content analysis engine 104 identifies one or more enrichment services 116 and accesses their service entries in service description database 112. In this exemplary embodiment, a user may specify which enrichment services 116 to use. For example, a user may specify that at least four general enrichment services 116 (e.g., search engine services, encyclopedias, etc.) should be used, along with at least one specific enrichment service 116 (e.g., a service specific to a theme detected in the query terms).

In step 804, content analysis engine 104 queries enrichment services 116 identified in step 802. In this exemplary embodiment, content analysis engine 104 creates queries using the appropriate schemas stored in the respective service entries, and includes query terms found in the original request sent to service 118 (e.g., the user's search terms). Content analysis engine 104 may also optionally impersonate a user by including identifying information in the query (e.g., where a certain degree of content personalization is desirable). Content analysis engine 104 then transmits the created queries to the identified enrichment services 116 via network 122.

In step 806, content analysis engine 104 receives responses from enrichment services 116, and extracts text content therefrom, and parses the text content into text elements. As previously discussed with regard to service 118, enrichment services 116 may use different schema and formatting, so content analysis engine 104 accesses service description database 112 to extract text content pursuant to the appropriate schemas. In addition, a user may specify how content analysis engine 104 parses the text content, including a limit on the maximum number of keywords allowed for a given text element.

In step 808, content analysis engine 104 detects one or more themes and refinements in the response content. In this exemplary embodiment, content analysis engine 104 detects themes and refinements in the response content by searching themes and refinements (i.e., lists of text elements associated with those themes and refinements) stored in classification database 110 for the text elements parsed from the response content in step 806, using the same methodologies discussed with regard to FIG. 7 and FIG. 7 (CONT.).

In step 810, content analysis engine 104 optionally detects censorship being performed by one or more of enrichment services 116. In this exemplary embodiment, content analysis engine 104 may optionally detect censorship by sending a query to enrichment services 116 using multiple connection paths (e.g., different proxies, VPN gateways, or other services) and comparing the themes and refinements detected in the corresponding responses. If content analysis engine 104 determines there is discrepancy in the detected themes and refinements, or determines that some responses include no content, content analysis engine 104 may flag services that return such responses as being potentially censored, signaling that that the service should always be queried using obfuscated connections in the future.

In another embodiment of the present invention, content analysis engine 104 may also optionally detect censorship being performed by service 118. For example, the absence of requested content in the response from service 118 (i.e., a "no content" situation) and the presence of content in responses obtained from enrichment services 116 (e.g., steps 714 and 722 of FIG. 7 (CONT.)), may indicate potential censorship by service 118. In response, content analysis engine 104 may retransmit the request to service 118 using multiple connection paths. If content analysis engine 104 determines that these responses include requested content, content analysis engine 104 may flag service 118 as being potentially censored, signaling that the service should always be queried using obfuscated connections in the future.

Responsive to content analysis engine 104 determining that the response from service 118 does not contain requested data, and responsive to obtaining additional content enrichment services 116, content analysis engine 104 may also optionally detect censorship by service 118. For example, content analysis engine 104 may optionally detect censorship by sending a query to enrichment services 116 using multiple connection paths (e.g., different proxies, VPN gateways, or other services) and comparing the themes and refinements detected in the corresponding responses. If content analysis engine 104 determines there is discrepancy in the detected themes and refinements, or determines that some responses include no content, content analysis engine 104 may flag services that return such responses as being potentially censored, signaling that that the service should always be queried using obfuscated connections in the future. In another exemplary embodiment, content analysis engine 104 may receive a no content response from service 118 during an initial request from client computer system 120, but receive relevant responses from enrichment services 116. Accordingly, content analysis engine 104 may flag service 118 for potential censorship.

In step 812, content analysis engine 104 filters the responses from enrichment services 116 pursuant to user specified criteria. In this exemplary embodiment, content analysis engine 104 determines whether the responses contain content that is sufficiently diverse, as described in step 718 of FIG. 7 (CONT.). Content analysis engine 104 also determines whether the themes and/or refinements detected in the content of the responses match one or more lacking themes identified for the response from service 118 (e.g., as identified in step 720 of FIG. 7 (CONT.)). In this exemplary embodiment, content analysis engine 104 discards responses from enrichment services 116 whose detected themes and/or refinements do not match a lacking theme, and content analysis engine 104 discards responses from enrichment services 116 whose content is not sufficiently diverse. In other embodiments, other criteria may be used to filter the responses from enrichment services 116. After performing step 812, one or more responses from enrichment services 116 may remain for use in enriching the response from service 118.

In step 814, content analysis engine 104 creates an enriched response. In this exemplary embodiment, content analysis engine 104 selects a remaining response having the most matches for the one or more lacking themes. Content analysis engine 104 then modifies the response from service 118 to include the extracted text content from the selected response. In some instances, content analysis engine 104 may modify the response from service 118 to include extracted text content from multiple responses from enrichment services 116.

In this exemplary embodiment, content analysis engine 104 modifies the response from service 118, in accordance with response injection schemas and one or more templates obtained from service description database 112. More specifically, the injection schema specify any content to be extracted from the original response, a reference to a template file containing code to use for responses from service 118, and an insertion point for the template code. The extracted text content from the selected response may be inserted into the template code (e.g., replacing generic placeholders in the template code), and the modified template code may then be inserted into the response at the specified insertion point to generate the enriched response. Accordingly, the injection schemas and templates enable content analysis engine 104 to remove content and/or add additional content into the response from service 118, while ensuring that such additional content conforms to the format of responses from service 118 and will, therefore, display properly to a user of client computer system 120.

EXAMPLE

The following example discusses a hypothetical scenario in which a response from service 118 is enriched, and the enriched response is sent to client computer system 120.

In this example, service 118 is a search engine, and the response from service 118 comprises a webpage incorporating HTML, CSS, and XML to display a plurality of search results, where each search result is a list item, <li>, in an ordered list, <ol>. The enrichment content to be added to the response from service 118 is an alternative search result, obtained from another search engine serving as one of enrichment services 116. The injection schema for service 118 comprises extraction and integration information defining a target XPath for content to be extracted from the response (i.e., a list item for a particular search result in the ordered list for the search results), a reference to the template file to use for the service, and the insertion point for the template contents. The insertion point, in this example, is defined using a selector identifying the ordered list in which the alternative search result should be inserted (e.g., ol[@id="search_results"]). The template in this example specifies the code used by this particular service for each list element of the identified ordered list, with generic place holders for URLS, captions, and other attributes of the search result.

After obtaining an alternative search result (i.e., enrichment content) from one of enrichment services 116, content analysis engine 104 inserts the details of that alternative search result into the generic place holders of the template, and then inserts the completed template code into the code of the response from service 118 as a list item member of the ordered list "search_results". The modified response is then transmitted to a user of client computer system 120, where the page can be displayed to the user in a browser, including the alternative search result in addition to, or instead of, a search result that would otherwise have been provided by service 118 in the original response.

Figure 9:
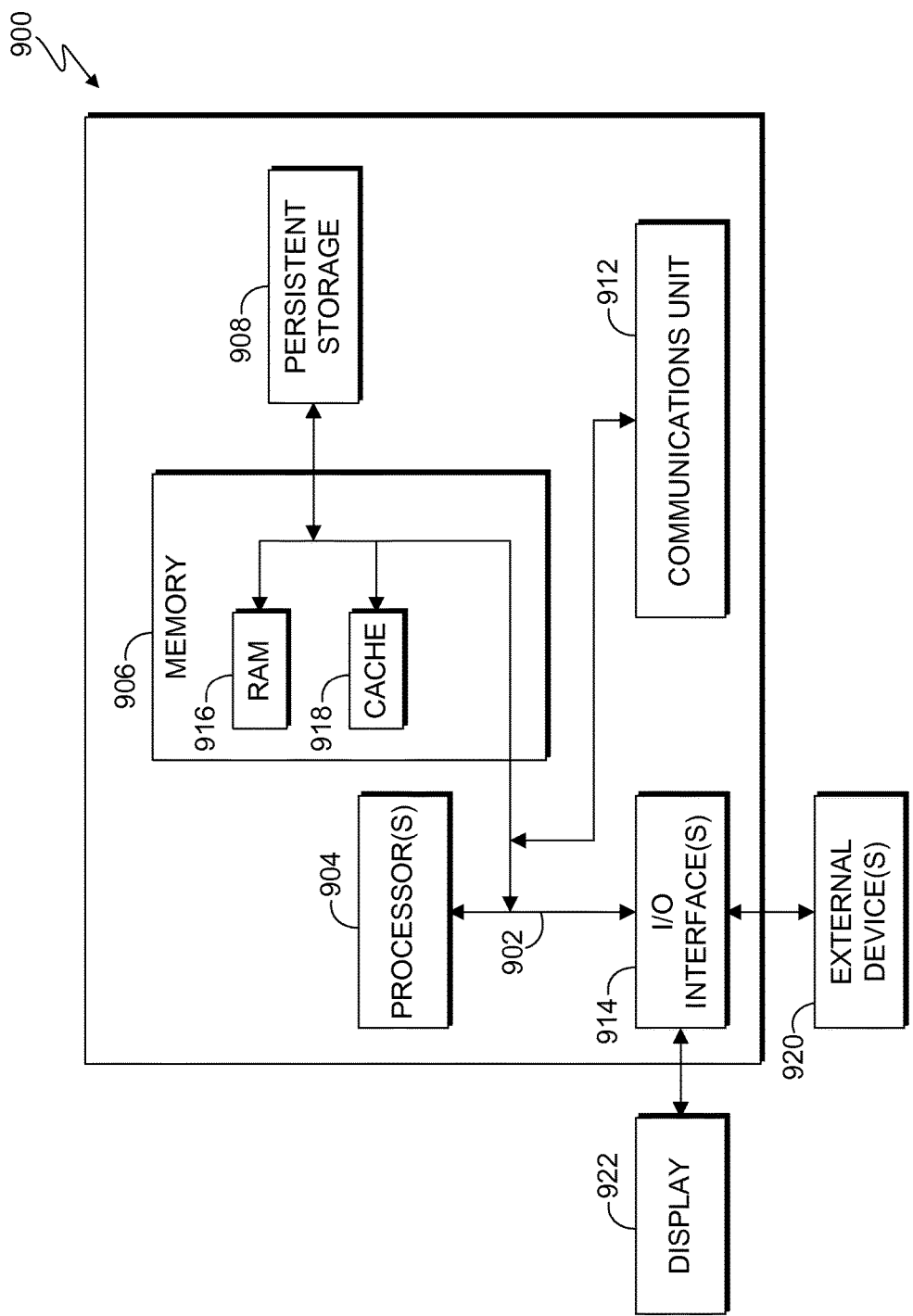
FIG. 9 is a block diagram of internal and external components of the computer systems of FIG. 1, in accordance with an embodiment of the present invention.

FIG. 9 is a block diagram of internal and external components of a computer system 900, which is representative the computer systems of FIG. 1, in accordance with an embodiment of the present invention. It should be appreciated that FIG. 9 provides only an illustration of one implementation and does not imply any limitations with regard to the environments in which different embodiments may be implemented. In general, the components illustrated in FIG. 9 are representative of any electronic device capable of executing machine-readable program instructions. Examples of computer systems, environments, and/or configurations that may be represented by the components illustrated in FIG. 9 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 900 includes communications fabric 902, which provides for communications between one or more processors 904, memory 906, persistent storage 908, communications unit 912, and one or more input/output (I/O) interfaces 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media. Software is stored in persistent storage 908 for execution and/or access by one or more of the respective processors 904 via one or more memories of memory 906.

Persistent storage 908 may include, for example, a plurality of magnetic hard disk drives. Alternatively, or in addition to magnetic hard disk drives, persistent storage 908 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 908 can also be removable. For example, a removable hard drive can be used for persistent storage 908. Other examples include optical and magnetic disks, thumb drives, and smart cards that are inserted into a drive for transfer onto another computer-readable storage medium that is also part of persistent storage 908.

Communications unit 912 provides for communications with other computer systems or devices via a network (e.g., network 122). In this exemplary embodiment, communications unit 912 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 912 (e.g., via the Internet, a local area network or other wide area network). From communications unit 912, the software and data can be loaded onto persistent storage 908.

One or more I/O interfaces 914 allow for input and output of data with other devices that may be connected to computer system 900. For example, I/O interface 914 can provide a connection to one or more external devices 920 such as a keyboard, computer mouse, touch screen, virtual keyboard, touch pad, pointing device, or other human interface devices. External devices 920 can also include portable computer-readable storage media such as, for example, thumb drives, portable optical or magnetic disks, and memory cards. I/O interface 914 also connects to display 922.

Display 922 provides a mechanism to display data to a user and can be, for example, a computer monitor. Display 922 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for processing a response from a service, the method comprising:
   receiving, by one or more computer processors, a first response from a service, wherein the first response is generated as a response to a query sent to the service from a computer system;
   extracting, by one or more computer processors, text content from the first response;
   determining, by one or more computer processors, whether the extracted text content from the first response is diverse in accordance with a user specification, wherein the user specification comprises a user-specified representation of diversity, and wherein diverse text content comprises text content associated with a requisite number of themes based on the user specification, wherein one or more themes classify text content into a category; and
   responsive to determining that the extracted text content from the first response is not diverse in accordance with the user specification, modifying, by one or more computer processors, the first response to create a second response that is diverse in accordance with the user specification, wherein modifying, by one or more computer processors, the first response to create a second response that is diverse in accordance with the user specification comprises:
      querying, by one or more computer processors, one or more enrichment services using terms of the query;
      receiving, by one or more computer processors, a plurality of responses from the one or more enrichment services;
      detecting, by one or more computer processors, one or more themes of text content extracted from the plurality of responses;
      selecting, by one or more computer processors, one or more responses of the plurality of responses based, at least in part, on the detected one or more themes; and
      modifying, by one or more computer processors, the first response to create a second response comprising text content extracted from the selected one or more responses.

2. The method of claim 1, further comprising:
   responsive to determining that the extracted text content from first response is not diverse in accordance with the user specification, initiating transmission, by one or more computer processors, of the second response to the computer system.

3. The method of claim 2, further comprising:
   responsive to determining that the extracted text content from the first response is diverse in accordance with the user specification, initiating transmission, by one or more computer processors, of the first response to the computer system.

4. The method of claim 1, wherein extracting, by one or more computer processors, text content from the first response comprises:
   obtaining, by one or more computer processors, one or more schemas for the service;
   extracting, by one or more computer processors, text content from the first response using the one or more schemas obtained for the service; and
   parsing, by one or more computer processors, the extracted text content from the first response into a plurality of text elements.

5. The method of claim 1, wherein determining, by one or more computer processors, whether the extracted content from the first response is diverse in accordance with a user specification comprises:
   detecting, by one or more computer processors, one or more themes of the extracted text content from the first response; and
   determining, by one or more computer processors, whether the detected themes are diverse in accordance with a user specification.

6. The method of claim 1, wherein modifying, by one or more computer processors, the first response to create a second response that is diverse in accordance with the user specification comprises:
   obtaining, by one or more computer processors, additional content from an enrichment service;
   obtaining, by one or more computer processors, one or more schemas for the enrichment service; and modifying, by one or more computer processors, the first response to create a second response that includes the additional content using the one or more schemas obtained for the enrichment service.

7. The method of claim 6, wherein the additional content is pre-fetched from the enrichment service.

8. The method of claim 6, further comprising:
creating, by one or more computer processors, a service entry for the service comprising identification information, accessibility information, and capability information for the service;
creating, by one or more computer processors, a service entry for the enrichment service comprising identification information, accessibility information, and capability information for the enrichment service; and
storing the service entries for the service and the enrichment service in a database.

\* \* \* \* \*